United States Patent [19]
Boyd et al.

[11] Patent Number: 5,871,839
[45] Date of Patent: Feb. 16, 1999

[54] REDUCING GALVANIC DEGRADATION OF HYBRID METAL/COMPOSITE STRUCTURES

[75] Inventors: Jack D. Boyd, San Clemente; Lawrence C. Hopper, Tustin, both of Calif.

[73] Assignee: CYTEC Technology Corporation, Wilmington, Del.

[21] Appl. No.: 876,101

[22] Filed: Jun. 13, 1997

Related U.S. Application Data

[62] Division of Ser. No. 443,493, May 15, 1995, Pat. No. 5,639,565, which is a division of Ser. No. 122,036, Sep. 14, 1993, Pat. No. 5,643,499, which is a continuation-in-part of Ser. No. 944,555, Sep. 14, 1992, abandoned.

[51] Int. Cl.$^6$ ........................................................ B32B 5/16
[52] U.S. Cl. ...................... 428/328; 428/425.9; 428/469; 428/458; 428/626; 428/628
[58] Field of Search ...................................... 428/357, 372, 428/451, 223, 628, 626, 469, 458, 463, 328, 323, 47.5, 304.4, 317.9, 425.9; 523/457, 452, 460, 448, 223, 458; 524/424, 367, 83; 525/113, 114, 117, 422; 526/262; 528/322

[56] References Cited

U.S. PATENT DOCUMENTS

| | | | |
|---|---|---|---|
| 3,446,770 | 5/1969 | King | 252/503 |
| 3,826,425 | 7/1974 | Scharfenberger et al. | 239/700 |
| 3,976,617 | 8/1976 | Vasta | 260/39 R |
| 4,009,043 | 2/1977 | Preis | 106/204 |
| 4,009,403 | 2/1977 | Preis | 106/204 |
| 4,051,066 | 9/1977 | Miksic et al. | 252/389 R |
| 4,454,283 | 6/1984 | Street et al. | 524/424 |
| 4,478,915 | 10/1984 | Poss et al. | 428/607 |
| 4,505,748 | 3/1985 | Baxter | 106/14.39 |
| 4,818,777 | 4/1989 | Braig | 524/83 |
| 4,996,109 | 2/1991 | Krieg et al. | 428/304 |
| 5,061,566 | 10/1991 | Morgan | 428/423.1 |
| 5,116,672 | 5/1992 | Mosser et al. | 428/328 |
| 5,639,565 | 6/1997 | Boyd et al. | 428/628 |

FOREIGN PATENT DOCUMENTS

| | | |
|---|---|---|
| 0356714 A1 | 3/1990 | European Pat. Off. . |
| 0429180 A2 | 5/1991 | European Pat. Off. . |
| 0437979 A2 | 7/1991 | European Pat. Off. . |
| 1093200 | 11/1967 | United Kingdom ........................ 8/131 |
| 2205319 A | 12/1988 | United Kingdom . |
| 91/11897 | 8/1991 | WIPO . |

OTHER PUBLICATIONS

International Search Report For PCT/US93/08605 Dated: Dec. 29, 1993.
ASTM G-71 (1982).
ASTM B-117 (1979).
B.G. Clubley. "Chemical Inhibitors of Corrosion Control". Corrosion National Association of Corroslon Engineers, 38 (Jul. 1982), 374–382.
S.D. Thompson and J.A Snide; "Accelerated Corrosion Testing of Graphite/Epoxy Composites and Aluminum Alloy Mechanically–Fastened Joints". Flight Dynamics Laboratory, Air Force Wright Aeronautical Laboratories, AFWAL–JR–84–3115 (Jun. 1995).
M.C. Faudree, "relationship of Graphite/Polyimide Composites to Galvanic Processes", 36th International Sample Symposium; (Apr. 15–18, 1991). p.p. 1288–1301.
Jack Boyd et al., "Galvanic Corrosion Effects on Carbon Fiber Composites". 36th International Sample Symposium, (Apr. 15–18, 1991), pp. 1217–1231.
H. Leidheiser, Jr., "Corrosion of Painted Metals—A Review", National Association.
R. H. Stone, "Dissimilar Material Separation" in *Engineered Materials Handbook: Composites*, vol. 1, pp. 716–18 (1987).

*Primary Examiner*—Merrick Dixon
*Attorney, Agent, or Firm*—Kristin H. Neuman; Michael J. Kelly; Claire M. Schultz

[57] ABSTRACT

Galvanic degradation under salt spray or salt water conditions in hybrid structures containing a corrosible metal and a conductive fiber reinforced polymer matrix composite is reduced through the addition to the polymer matrix of the composite of an effective amount of an inorganic corrosion/degradation inhibitor.

5 Claims, 3 Drawing Sheets

REDUCING GALVANIC DEGRADATION OF HYBRID METAL/COMPOSITE STRUCTURES

This is a divisional of copending application Ser. No. 08/443,493, filed May 15, 1995, which will issue as U.S. Pat. No. 5,639,565 on Jun. 17, 1997, which in turn is a divisional of application Ser. No 08/122,036, filed Sep. 14, 1993, now U.S. Pat. No. 5,643,499 which is continuation in part of application Ser. No. 07/944,555, filed Sep. 14, 1992, now abandoned.

This is a continuation in part of Application Ser. No. 07/944,555, filed Sep.14, 1992, incorporated herein by reference as if fully set forth.

BACKGROUND OF THE INVENTION

1. Field of the Invention

The subject invention pertains to conductive fiber reinforced composites, and hybrid structures of metals and such composites. More particularly, the subject invention pertains to methods for reducing galvanic degradation of such composites and galvanic corrosion of metals which are electrically connected thereto.

2. Description of the Related Art

Galvanic corrosion of metals is a thoroughly researched and relatively well understood phenomenon. The presence of two metals of differing electrochemical potential or the presence within one metal part of demes having different electrochemical potential (as, for example, occurs in carbon rich zones in iron and carbon steel) will result in the creation of a galvanic cell when exposed to oxygen and an electrolyte solution, resulting in rapid corrosion.

In order to prevent galvanic corrosion, one of the necessary components of the galvanic cell must be eliminated or its effectiveness somehow thwarted. One of several solutions or redundant combinations thereof are commonly used. One such method is to introduce a third, more electrochemically active (sacrificial) metal which will itself predominately corrode. The use of a more active sacrificial metal such as magnesium or zinc has been utilized in gross structure, and on specialized applications such as ocean going vessels and power boats, the latter to protect aluminum outdrives. Use of sacrificial coatings, ingots and the like, however, adds unnecessary weight, must be frequently monitored and replaced as necessary, and is not effective for portions of the structure which are or may become electrically isolated. Moreover, when the corrosible metal is itself an active metal, a more electrochemically active metal may not exist or lend itself to fabrication.

A second, more common method of reducing galvanic corrosion is to paint the metal surface with a coating which is impervious to oxygen and/or electrolyte solution. Unfortunately, no known polymeric coating is completely water or oxygen impervious. Moreover, inadequate coverage, particularly around edges and other irregularly shaped surfaces, and defects in the coatings caused by scratching, collision, flexing of the part, etc., can rapidly decrease the ability of such coatings to provide protection.

A third method of protection, in concert with the second, is to add to the paint or coating corrosion inhibitors which function to coat, through chemical reaction, with a more impervious coating than the paint itself, or which slowly migrate to the metal surface, and which interfere with the cathodic or anodic reactions which take place in the metal couple. Examples of corrosion inhibitors are lead compounds, which are no longer used due to toxicity and environmental concerns, and chromates, which are affected by these same concerns but to a lesser degree.

These and other methods of reducing corrosion are discussed in Chemical Inhibitors for Corrosion Control, Proc. of the Int. Symp. Organized by the Industrial Div. of the Royal Society of Chemistry and the Institution of Corrosion Science and Technology, University of Manchester, Apr. 21-22, 1988, B.G. Clubley, Ed.; and H. Leidkeiser, Jr., "Corrosion of Painted Metals - A Review," appearing in Corrosion, National Association of Corrosion Engineers, Vol. 38, No. 7, Jul. 1982, pp. 374–382.

Fiber reinforced, polymer matrix composites are being increasingly used in the aerospace and transportation industries. These products offer exceptional strength and rigidity while at the same time allowing weight savings over metal counterparts. As the toughness of such composite materials has increased, so has their utilization. In many structures, however, it is necessary to attach such composite structures to metal parts. If the reinforcing fibers are non conductive, such as glass, quartz or Spectra® polyolefin fibers, then such "hybrid" structures function well for extended periods of time, even in aggressive environments. In the early 1980's, however, it was discovered that when hybrid structures were prepared using conductive carbon fiber reinforced epoxy resin composites, that galvanic corrosion of the attached metal may occur, the conductive fibers serving as the cathode in the galvanic cell. With aluminum substrates, currents on the order of milliamps may be measured between the exposed carbon fibers and the aluminum. See S.D. Thompson, B.L. White and J.A. Snide, Accelerated Corrosion Testing of Graphite/Epoxy Composites and Aluminum Alloy Mechanically-Fastened Joints, Flight Dynamics Laboratory, Air Force Wright Aeronautical Laboratories, report AFWAL-JR-84-3115. Suggested methods for combatting such corrosion were the same methods traditionally utilized for metal/metal galvanic corrosion isolation of substrates from one another, or from oxygen or electrolyte, by painting, in particular painting the machined edge of the composite where carbon fibers are directly exposed to the environment. It was, however, noticed that voids in the paint were not uncommon, and corrosion would be expected to be accelerated at such locations due to trapping of moisture (electrolyte) at these locations. Thus, galvanic corrosion of metals in electrical contact with carbon fibers was still viewed as a potential problem despite the use of protective measures.

This perceived problem was enhanced with the discovery that not only did hybrid structures cause galvanic corrosion of metals but, moreover, degradation of the polymer matrix of the composite could occur if the polymer matrix is susceptible to base hydrolysis. As the majority of composite parts contained epoxy based matrix resins which are relatively immune from such attack, this phenomenon had gone unnoticed. At the 36th International SAMPE Symposium, Apr. 15–18, 1991, two papers were presented which directed attention to composite degradation. In "Galvanic Corrosion Effects on Carbon Fiber Composites,"J. Boyd et al., pp. 1217–1231; and "Relationship of Graphite/Polyimide Composites to Galvanic Processes, " M.D. Faudree, pp. 1288–1301, evidence was presented that composites containing carbon fiber reinforced bismaleimide polymer matrices themselves degraded in addition to promoting corrosion of aluminum. The degradation was clearly shown by actual loss of polymer matrix as well as increasingly exposed amounts of fibers.

This effect is illustrated in FIG. 1, in which a galvanic cell is created when a corrosible metal (such as aluminum) is electrically connected to a conductive fiber (such as carbon) reinforced composite. The metal serves as the anode while the conductive fibers serve as the cathode. The anode reaction results in dissolution of the metal thusly:

Al +3Cl → AlCl$_3$ +3e, while the reaction at the cathode may be reviewed as:

4e +O$_2$ +Na+ +2H$_2$ → 4NaOH, or

2e +2H$_2$O +2Na+ → 2NaOH +H$_2$

Although not wishing to be bound by any particular theory, it is believed that the creation of hydroxide ions is responsible for polymer degradation through base hydrolysis or resin fiber debonding.

Among the solutions to the corrosion/degradation problem proposed by the aforementioned articles include traditional methods of protection, via paints or corrosion inhibiting primers, or by use of non conductive scrim layers between the composite and metal to provide electrical insulation. Unfortunately, these methods add cost and weight to the structure, and are not viewed by airframe manufacturers as entirely satisfactory. In addition, because of the sensitivity of air frame manufacturers in particular to any loss in strength or other physical properties of aircraft parts which have the potential of corroding or degrading galvanically, there has been some resistance to use hybrid structures of composites containing conductive fibers and a polymer matrix susceptible to degradation.

It is, therefore, an object of the subject invention to provide processes and compositions for use therein which offer the potential of reducing galvanic action in both a galvanically corrosible metal as well as a galvanically degradable polymer matrix composite when these are contained in hybrid metal/composite structures.

SUMMARY OF THE INVENTION

These and other objects are achieved by incorporation into the polymer matrix of an inorganic corrosion/degradation inhibitor.

More specifically, the present invention provides a process for reducing galvanic corrosion of a corrosible metal in a hybrid structure comprising the corrosible metal in electrical connection to conductive fibers of a conductive fiber reinforced polymer matrix composite, by incorporating into the composite an amount of an inorganic inhibitor effective to reduce the amount of corrosion of the metal, as measured on a test specimen after 625 hours of exposure in accordance with ASTM B-117 (1979).

In addition, the present invention provides a process for reducing polymer degradation of a polymer matrix of a conductive fiber reinforced degradable polymer matrix composite in a hybrid structure comprising a corrosible metal in electrical connection to conductive fibers of the composite, by incorporating into the composite an amount of an inorganic inhibitor effective to reduce degradation of the polymer matrix, as determined on a test specimen after 625 hours of exposure in accordance with ASTM B-117 (1979).

The present invention also provides a process for reducing galvanic corrosion of a corrosible metal and/or reducing polymer degradation of a polymer matrix in a hybrid structure comprising the corrosible metal in electrical connection to conductive fibers of a conductive fiber reinforced polymer matrix composite, by incorporating into the composite an amount of an inorganic inhibitor effective to reduce the current density measured in a degraded zone of the matrix composite, as measured on test specimens after 625 hours of exposure in accordance with ASTM B-117 (1979).

The present invention further provides a hybrid structure comprising a corrosible metal in electrical connection to conductive fibers of a conductive fiber reinforced polymer matrix composite (such as a prepreg), wherein the composite has incorporated therein an amount of an inorganic inhibitor effective to reduce the amount of corrosion of the metal, as measured on a test specimen after 625 hours of exposure in accordance with ASTM B-117 (1979).

The present invention still further provides a hybrid structure comprising a corrosible metal in electrical connection to conductive fibers of a conductive fiber reinforced polymer matrix composite (such as a prepreg), wherein the composite has incorporated therein an amount of an inorganic inhibitor effective to reduce degradation of the polymer matrix, as determined on a test specimen after 625 hours of exposure in accordance with ASTM B-117 (1979).

Finally, the present invention provides a hybrid structure comprising a corrosible metal in electrical connection to conductive fibers of a conductive fiber reinforced polymer matrix composite (such as a prepreg), wherein the composite has incorporated therein an amount of an inorganic inhibitor effective to reduce the current density measured in a degraded zone of the matrix composite, as measured on test specimens after 625 hours of exposure in accordance with ASTM B-117 (1979).

As utilized herein, "effective to reduce" refers to a comparison of identical test specimens, one incorporating the inorganic inhibitor into the composite and the other containing no such inorganic inhibitor.

Despite the discovery of galvanic corrosion in hybrid structures at least as early as Jun. 1985, and later discovery of polymer degradation in such hybrid structures, the solutions of the present invention have never before been proposed or suggested.

These and other features and advantages of the present invention will be more readily understood by those skilled in the art from a reading of the following detailed description with reference to the accompanying drawings.

DESCRIPTION OF THE PREFERRED EMBODIMENTS

Figure 1:
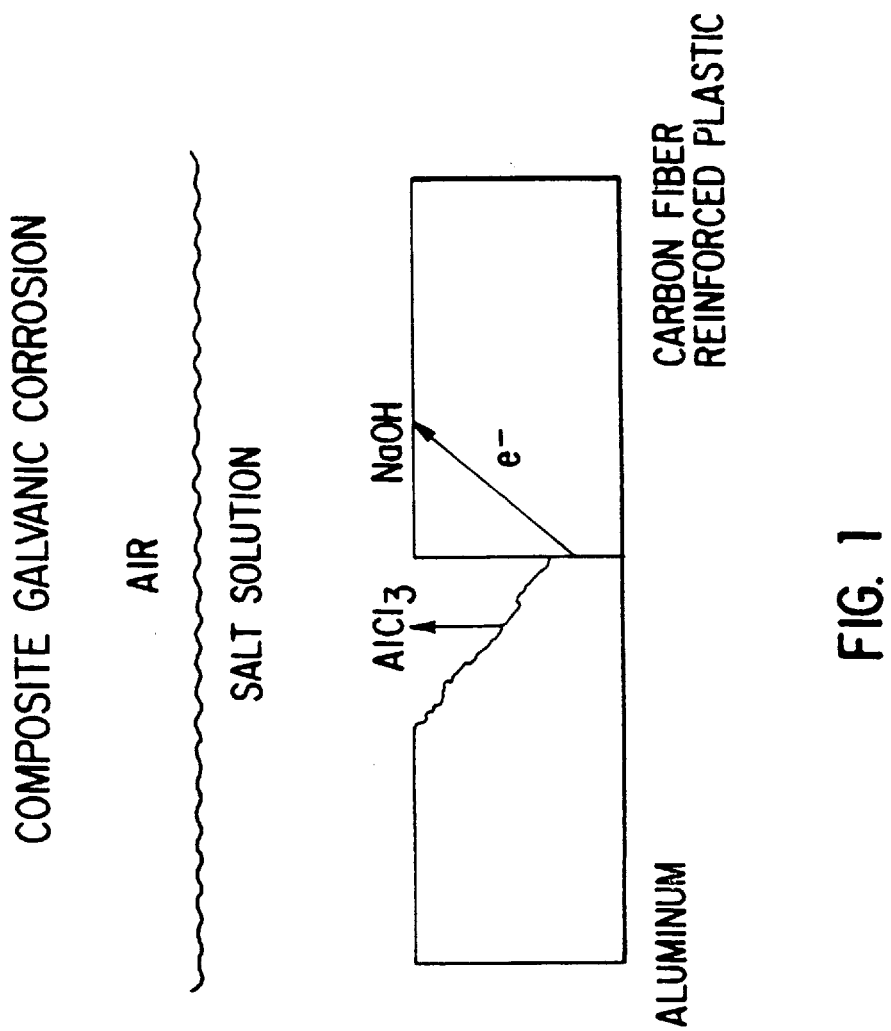
FIG. 1 illustrates the galvanic cell created between a corrosible metal (aluminum, in this case) and a conductive fiber (carbon) reinforced polymer matrix composite which can result in galvanic corrosion of the metal and degradation of the composite.
Figure 2B:
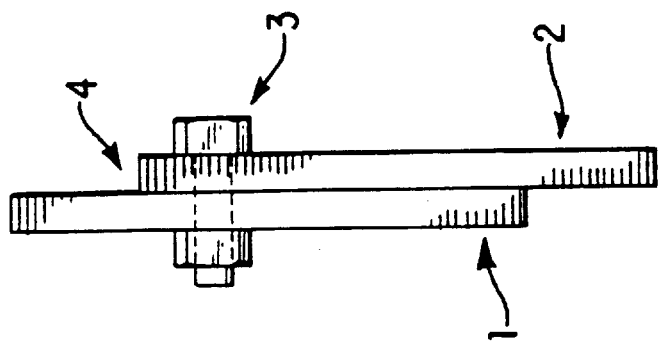
FIG. 2 illustrates the test specimen which is utilized in conjunction with the ASTM B-117 salt spray corrosion test, in accordance with the present invention, to determine suitable inorganic inhibitors and to quantitatively assess corrosion, qualitatively assess degradation and measure the current density of hybrid structures.
Figure 2A:
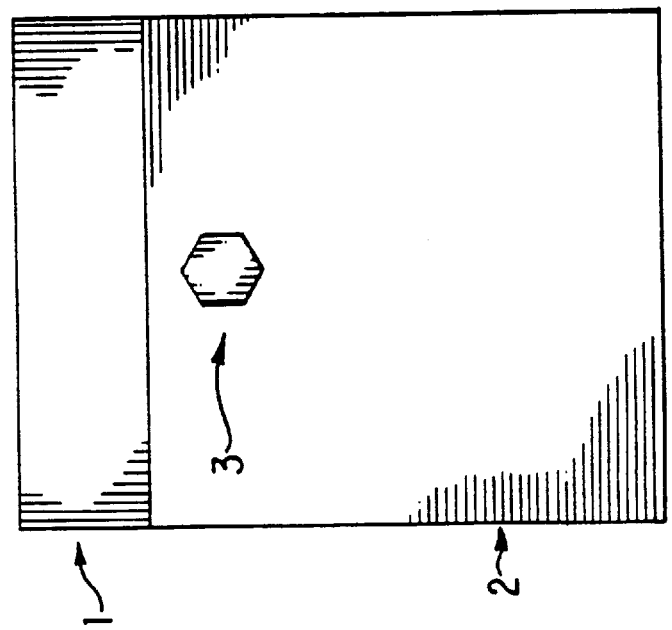
Figure 3B:
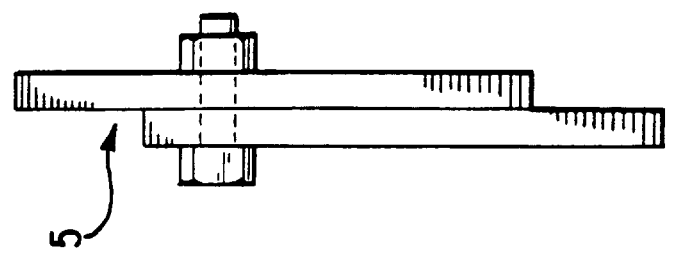
FIG. 3 illustrates how corrosion is measured from the specimen of FIG. 2.
Figure 3A:
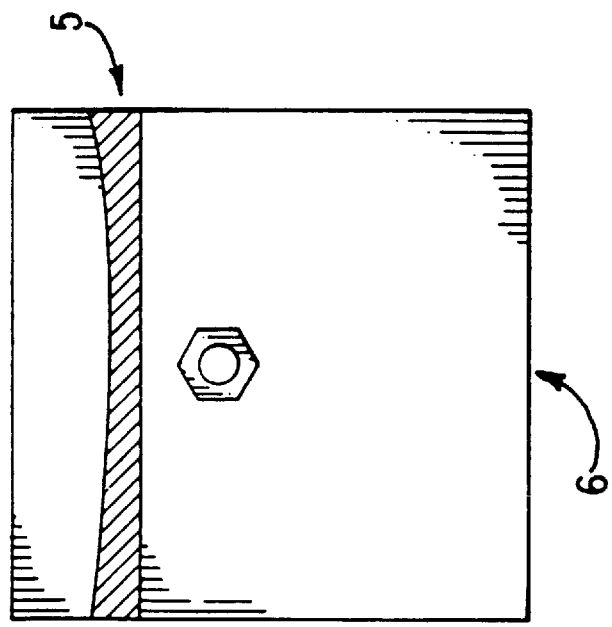

Referring now to FIG. 2, (1) is a corrosible metal ((6) on FIG. 3) in electrical connection to and in abutting relationship with a composite (2), (3) is a through bolt, and (4) is the interface ("shelf") formed by the topmost edge of the composite where the composite contacts the metal. It is at the interface of the metal and composite "shelf" where electrolyte can readily collect and, consequently, where corrosion is most apparent (see (5) on FIG. 3). The test specimen utilized for assessing corrosion in accordance with the present invention comprises a metal plate (1) of 0.125 inch (0.32 cm) thickness and measuring 4 ×4 inches (10.2 ×10.2 cm), which is attached to a similarly sized composite panel (2) of 24 plies in a quasiisotropic layup. A hybrid structure is formed by attaching the two parts, staggered from each other by 1 inch (2.54 cm) using a titanium through bolt. Titanium was selected as it is essentially non corrosible, although other non corrosible fastening materials such the various stainless steels, platinum and the like, are also suitable.

The effectiveness of an inorganic inhibitor is determined in accordance with the present invention by placing two test specimens, one containing the inhibitor in the composite and the other without such inhibitor but otherwise identical, concurrently or consecutively in a salt spray chamber and exposing the same to salt solution prepared by dissolving 5+1 parts sodium chloride in 95 parts distilled water, and otherwise meeting the requirements of ASTM B-117-73 (1979), paragraph 6. The temperature of the test should be about 35° C. (95°F.). For other conditions, the ASTM test method should be referred to. The test specimens should be inclined to 15° from the vertical.

The duration of the test is not critical, but should be maintained over such at time span that corrosion/degradation can be quantitatively and qualitatively assessed. Duration of from 300 to about 1,000 hours is recommended. Durations of 500 and 625 hours, for example, have proven most useful. For the purposes of the present invention, determinations are made after 625 hours of exposure. The quantitative measure of corrosion is the area, in $cm^2$, of the corroded metal surface most nearly adjoining the shelf (see (5) of FIG. 3) of the detached metal (see (6) of FIG. 3). Polymer degradation is measured qualitatively and current density is measure as described below.

As used herein, "corrosible metal" is a metal which exhibits corrosion when in electrical connection to the conductive fibers of a conductive fiber composite and exposed to the ASTM B-117 salt spray test as described above. This will generally include any metal more electropositive than the particular conductive fiber used in the conductive fiber composite. Taking carbon fibers as an example, such conductive metals include, most commonly, aluminum, magnesium and their alloys, which are commonly used in the aerospace industry, as well as iron, non stainless steels and alloys thereof, which are more common in the general transportation and industrial sectors. Many stainless austenitic steels and titanium, however, are essentially non corrosible under the above test conditions and would not, consequently, fall within the definition.

The terms "conductive fiber reinforcement," "conductive fibers" and the like refer to fibers which exhibit marked electrical conductivity such as, for example, carbon fibers (ranging from amorphous to graphite fibers), silicon carbide fibers, boron nitride fibers, silicon nitride fibers and the like, whose conductivity is considered to be too high to be insulative. Generally, the conductivity of such fibers places them in the category of semiconductors. Fibers which are insulative rather than conductive are not within the definition of conductive fibers. As examples of such may be mentioned quartz, glass, polyolefin and the like fibers. Of course, composites containing non conductive fibers in the presence of conductive fibers would fall within the spirit of the present invention.

The polymer matrix may in general be any thermoseftable or thermoplastic matrix resin. Examples of thermosettable matrix resins include the epoxies, cyanates, bismaleimides, thermosettable polyimides, polyurethanes, polyisocyanurates and the like. Among the thermoplastic matrix resins suitable are the polyamides, polyolefins, polyoxymethylenes, polysulfones, polyethersulfones, polyetherketones, polyphenylene sulfides, polyphenylene ethers, polyesters including the liquid crystalline polyesters, polystyrenes, thermoplastic polyurethanes and the like. Of course, these lists of thermosetting and thermoplastic polymers are illustrative and not limiting, Combinations of thermosetting and thermoplastic polymers are also suitable.

As used herein, the term "degradable polymer matrix" refers to a polymer matrix of a conductive fiber reinforced part which, when attached to a corrosible metal, exhibits degradation under test conditions as described herein. Included in this category, but not limited thereto, are thermosetting resins based on bismaleimides, cyanate esters, isocyanates, thermosettable polyimides and mixtures of these, as well as mixtures thereof with another thermosetting resin, for example, diallybisphenols, epoxies, and the like. In the case of isocyanate monomers, the product may be a polyisocyanurate, or when a polyol or polyamine is used in conjunction with the isocyanate, a polyurethane, polyurea or polyurethane-urea. Included in this category also are saponifiable thermoplastics such as the saturated polyesters (including liquid crystalline polyesters), polyamides (aliphatic, aromatic and arylaliphatic), thermoplastic polyimides, thermoplastic polyurethanes, mixtures thereof and mixtures thereof with another thermoplastic resin. By "isaponifiable polymer" or similar terms is meant a polymer which is subject to base hydrolysis of otherwise degraded when in the presence of conductive fiber which serve as the cathode of a galvanic cell.

By "inorganic corrosion inhibitor" is meant an inorganic compound which is not a necessary component of a polymer matrix and which, when added to a polymer matrix, reduces galvanic corrosion, preferably by at least 20 percent when measured as described above, of an attached metal at the concentration utilized after extended exposure and, preferably, after 625 hours of exposure. When used in conjunction with other corrosion inhibiting substances, the reduction of corrosion refers to the combination, and not to the inorganic corrosion inhibitor alone, so long as the composition exhibits less corrosion with the inorganic corrosion inhibitor than without.

By "not a necessary component of a polymer matrix" is meant a compound which ordinarily would not be added to a thermosettable polymer system or a thermoplastic polymer in order to provide a matrix for prepregs and composites, i.e, is not a reactive monomer. In other words, such polymer systems can be created and at least initially have the necessary physical characteristics without addition of the compound in question.

As examples of inorganic corrosion inhibitors useful in the compositions and processes of the subject invention appear to include the class of cathodic corrosion inhibitors. As specific preferred examples may be mentioned zinc phosphate; basic zinc phosphate; basic zinc aluminum phosphates; MOLY-WHITE®212, a mixture prepared from calcium molybdate, calcium carbonate, and zinc oxide and available from the Sherwin Williams Corporation; Halox®SZP-391, a calcium strontium zinc. phosphosilicate corresponding to the formula $[CA]_{0.3}[SrO]_{0.05}[ZNO]_{0.15}[S:O]_{0.30}[H_2O]_{0.4}$ available from Halox® Pigments, a division of Hammond Lead Products, Inc., Hammond, Ind; zinc silicate modified aluminum tripolyphosphate; zinc hydroxylphosphite; calcium borosilicate; basic zinc molybdate; calcium zinc molybdate; calcium molybdate; zinc molybdate; basic zinc carbonate phosphate; calcium zinc phosphate glass; zinc tripolyphosphate, strontium tripolyphosphate; zinc phosphonate; zinc, calcium, or magnesium carboxylates such as naphthenates or alkanoates; zinc benzoates such as the SICORINO®RZ pigments available from BASF A.G., Ludwigshafen, Germany.; zinc borate; calcium borate; calcium phosphosilicate; zinc phosphosilicate; calcium barium phosphosilicate; calcium silicate; strontium silicate; zinc ferrite; calcium ferrite; calcium stannate; zinc stannate; silver oxides; and silver salts, particularly silver sulfate, silver tungstate and silver phosphate.

In most cases, the inorganic corrosion inhibitor will also function as an inorganic degradation inhibitor and vice versa. By "inorganic degradation inhibitor" is meant an inorganic compound which is not a necessary component of a polymer matrix and which, when added to a polymer matrix, qualitatively decreases observed polymer degradation. Collectively, inorganic corrosion inhibitors and inorganic degradation inhibitors are referred to as "inorganic inhibitors". Although the most quantitative measure known of effectiveness of a particular inorganic inhibitor is the reduction of metal corrosion, measured in accordance with the present invention by calculating the surface area ($cm^2$) of the corrosion along the line of the test specimen shelf (see (5) of FIG. 3), the degree of degradation of the polymer itself may be assessed visually. In degradable polymers, the smooth or machined surface of the composite shelf becomes etched as the polymer degrades and is washed away. In many cases, fiber ends can be detected by microscopic examination, protruding from the composite surface and, moreover, layers of exposed fibers and in same instances particle delamination may occur. While such polymer degradation may be easily observed, its quantification is difficult.

The effectiveness of inorganic inhibitors may also be detected through measurement of the galvanic current, or more precisely the current density in $pA/cm^2$, as the amount of current is at least somewhat proportional to composite surface area, particularly the face of the "shelf" where conductive fibers are exposed. A precision ammeter may be used to measure this current, for example as described in the 1982 Annual Book of ASTM Standards, Part 10, G71, p.1171–1175. An effective inorganic inhibitor is one in which the measured current density after exposure in a sample is less in comparison with an identical sample but without the inhibitor.

In addition to the methods mentioned above, other accelerated corrosion tests may be devised, for example, by subjecting test specimens to salt spray as in the ASTM test, removing the specimen for short periods and subjecting the specimen to a higher temperature, and then replacing the specimen in the spray chamber. Tests can also be by salt water soaking rather than spraying. There is no ASTM standard for this case. In some cases, aviation jet fuel may be added to the salt solution to accelerate the test. Tests with salt water/jet fuel are commonly used in assessing corrosion of fuel tanks, and are described in the Faudree article, infra.

In addition to the species of inorganic inhibitors listed above, one skilled in the art can readily identify without undue experimentation other suitable inorganic inhibitor species by any of the aforementioned tests.

These inorganic inhibitors are in general effective on a weight basis of from 0.5 to about 10.0 percent based on the weight of the polymer matrix. Higher amounts may be useful, but a loss of composite physical properties could occur in such cases. Loss of composite properties may be acceptable balanced against improved corrosion protection. Examples of such use are isolation plies containing either carbon or glass fibers which are located mediate to the metal adherend and the conductive fiber reinforced polymer matrix composite.

The foregoing more general discussion of the invention will be further exemplified by the following specific examples offered by way of illustration and limitation of the above described invention.

EXAMPLE 1

A bismaleimide based thermosetting matrix resin was prepared by conventional techniques from a 3:2 weight/weight mixture of Compimide®353, eutectic mixture of bismaleimide available from Shell Chemical, and diallylbisphenol A, available form Ciba Geigy. After complete homogenization of the resin mix, a film was prepared and used to impregnate Celion®G40–800 carbon fibers to form a unidirectional tape prepreg having a nominal resin content of 32 weight percent and an areal weight of 145 $g/m^2$. A 24-ply quasiisotropic laminate was prepared and subjected to standard cure, final cure temperature being 420° F. (215° C.). A 10.2×10.2 cm panel was machined from the laminate and assembled into a hybrid test specimen shown in FIG. 2. The metal was 2024 aluminum. The test specimen was subjected to 5 weight percent salt spray for 625 hours at 35° C.

The aluminum exhibited considerable corrosion. The amount is reported in $cm^2$ based on measurement of the corroded area along the line where the top composite shelf and the aluminum panel meet (see FIG. 3). The results are presented in Table 1. The composite also showed considerable visual degradation, the surface becoming etched and fibers showing.

EXAMPLES 2–5

Composites were prepared as in Example 1, but prior to filming, 3.1 weight percent of various inorganic corrosion inhibitors were added to the bismaleimide resin. Test specimens were prepared and tested in accordance with Example 1. Results are presented in Table 1. Note that the chromates, not considered inorganic inhibitors of the subject invention but one of the most widely used corrosion inhibitors generally, failed to substantially decrease degradation of the composite.

TABLE 1

| EXAMPLE | INORGANIC CORROSION INHIBITOR | COMPOSITE DEGRADATION | ALUMINUM CORROSION, $CM^2$ |
|---|---|---|---|
| 1 (comparative) | none | surface etched, fibers showing | 12 $cm^2$ |
| 2 (comparative) | BaCrO$_4$ (2.8) SrCrO$_4$ (0.3) | surface etched, fibers showing | 11 $cm^2$ |
| 3 | Zinc Phosphate | slight surface etching, no fibers showing | 4 $cm^4$ |
| 4 | MOLY-WHITE ® 212 | slight surface etching, no fibers showing | 5 $cm^2$ |
| 5 | HALOX ® SZP-391 | slight surface etching, no fibers showing | 9 $cm^2$ |

TABLE 1-continued

| EXAMPLE | INORGANIC CORROSION INHIBITOR | COMPOSITE DEGRADATION | ALUMINUM CORROSION, $CM^2$ |
|---|---|---|---|
| 6 | Silver Tungstenate | slight surface etching, no fibers showing | 3 cm$^2$ |

Many modifications and variations besides those specifically mentioned may be made in the techniques and structures described herein and depicted in the accompanying drawings without departing substantially from the concept of the present invention. Accordingly, it should be clearly understood that the form of the invention described and illustrated herein is exemplary only, and is not intended as a limitation on the scope thereof.

We claim:

1. A hybrid structure comprising a corrosible metal in contact with conductive fibers of an electrical conductive fiber reinforced polymer matrix composite, wherein the composite has incorporated therein an amount of an inorganic inhibitor effective to reduce the current density measured in a degraded zone of the matrix composite, as measured on test specimens after 625 hours of exposure in accordance with ASTM B-117 (1979).

2. The hybrid structure of claim 1, wherein the inorganic inhibitor is incorporated into the composite in an amount of from 0.5 to about 10 weight percent based on the weight of the polymer matrix.

3. The hybrid structure of claim 1, wherein the inorganic inhibitor is a cathodic inhibitor.

4. The hybrid structure of claim 1, wherein the inorganic inhibitor comprises one or more compounds selected from the group consisting of zinc phosphates, calcium strontium zinc phosphosilicates, calcium molybdates, silver salts and silver oxides.

5. The hybrid structure of claim 1, wherein the polymer matrix of the conductive fiber reinforced matrix composite is a degradable polymer matrix.

* * * * *